United States Patent [19]

Keur

[11] 4,160,982

[45] Jul. 10, 1979

[54] ANTI-DISPERSION ACCUMULATOR FOR INK JET PRINTING SYSTEM

[75] Inventor: Robert I. Keur, Niles, Ill.

[73] Assignee: A. B. Dick Company, Chicago, Ill.

[21] Appl. No.: 889,900

[22] Filed: Mar. 24, 1978

[51] Int. Cl.$^2$ .............. G01D 15/16

[52] U.S. Cl. .............. 346/75; 346/140 R

[58] Field of Search .............. 346/75, 140 R

[56] References Cited

U.S. PATENT DOCUMENTS

| | | | |
|---|---|---|---|
| 3,839,721 | 10/1974 | Chen | 346/75 |
| 3,945,020 | 3/1976 | Kraus | 346/75 |
| 4,081,804 | 3/1978 | Van Breemen | 346/75 |

*Primary Examiner*—Joseph W. Hartary
*Attorney, Agent, or Firm*—Peter S. Lucyshyn

[57] ABSTRACT

An ink jet printing system includes an ink ejection head for providing ink drops which are selectively charged and deflected in accordance with their charge as they traverse a path toward a recording medium. An accumulator or "dump" is positioned, in the operating mode of the system, adjacent to the recording medium to catch ink drops directed away from the medium. Before the printing is started, the charging and deflecting units are displaced from the ink path, and the accumulator is abutting the ejection head, effectively capturing any ink emanating from the head. When the system has been pressurized and is in all respects ready for operation, the accumulator is displaced away from the ejection head and along the normal path of the ink drops, thus "catching" all the drops until it reaches its normal operating position adjacent the medium. The charging and deflecting units are then moved into their normal operating positions. In the process of shut-down, the deflection and charging means are moved away from the ink path, and the accumulator is then retracted from its operating position adjacent the medium, again traversing the path of the ink drops and catching all the drops, until it again abuts the ejection head.

8 Claims, 3 Drawing Figures

ANTI-DISPERSION ACCUMULATOR FOR INK JET PRINTING SYSTEM

BACKGROUND OF THE INVENTION

Various processes of, and apparatuses for ink jet printing are now fairly well developed. For example, it is known that electrically conductive ink under pressure can be discharged through an orifice, broken-up into a stream of individual drops, and the charge or charge level on each of these discrete drops can be individually controlled. As the drops continue along a path toward the recording medium, such as a paper web, a pair of oppositely charged deflection plates positioned to either side of the ink drop path effect a deflection of each drop in accordance with its charge. If it is desired to leave a blank space on a portion of the medium, the charge level of that drop is controlled so its path terminates at a dump or an accumulator rather than at the record medium. This accumulator, dump or catcher includes a discharge channel for returing the ink to the reservoir or supply of ink under pressure. There are pressurized ink jet writing systems which do not break-up the stream into discrete droplets, but instead employ the stream or segments thereof. The present invention can be used to advantage in those systems too, if they include a dump displaced from the orifice for catching the ink which is directed so as not to mark the record medium.

Ink jet systems which are presently used release ink drops on start-up before the system is fully pressurized. Similarly, these systems have a transient decrease in ink pressure upon shutdown. The drops, expelled while the pressure is less than at the normal operating level, are not under proper control. Accordingly, those drops may impinge upon the components of the system, in one exemplary embodiment the charging unit, deflection unit, and the like. Though various systems for capping and uncapping the nozzle or ink ejection head are known in the art, the main objective of these systems is to prevent ink drying at the orifice from which the drops issue and for cleaning the orifice. Such systems concentrate on effecting a tight, even a hermetic, seal of the ink discharge orifice before start-up and after shutdown. Others effect a very rapid movement of a bayonet or shut-off plate into some portion of the ink path when the system is energized and de-energized. The prior art does not teach how to control the ink stream or drops in the gap between the nozzles and the record surface to prevent scatter or dispersion thereof on start-up and shut-down of the system.

It is, therefore, a primary object of the present invention to provide such an ink jet printing system in which unwanted dispersion is prevented both during start-up of the system and when the system is shut down.

SUMMARY OF THE INVENTION

A system for printing by directing an ink stream along a path toward a record medium includes an ink ejection head or nozzle defining an orifice for discharging ink. An ink stream characterizing assembly, for example a charging unit and a deflection unit, are disposed adjacent the path. Means is provided for applying a charge signal to the charging unit and for applying a potential difference to the deflection unit. An accumulator is provided adjacent the medium, and the accumulator includes means for discharging or carrying away accumulated ink.

Particularly in accordance with the present invention, means is coupled to the accumulator so that upon start-up of the system, with the characterizing assembly, in the preferred embodiment the deflection unit and the charging unit, moved away from the ink drop path, the accumulator is maintained in proximity to the ejection head until the system is ready for operation. Then the accumulator unit is moved along the ink drop path to a position adjacent the recording medium, and the ink stream characterizing assembly is moved back to its normal operating position. The reverse procedure is followed upon shutdown of the system, with the ink stream characterizing assembly moved from its normal position so that the accumulator can move along the ink path to a position adjacent the drop ejection head.

THE DRAWINGS

In the several figures of the drawings like reference numerals indicate like components, and in those drawings.

GENERAL BACKGROUND DESCRIPTION

Figure 1:
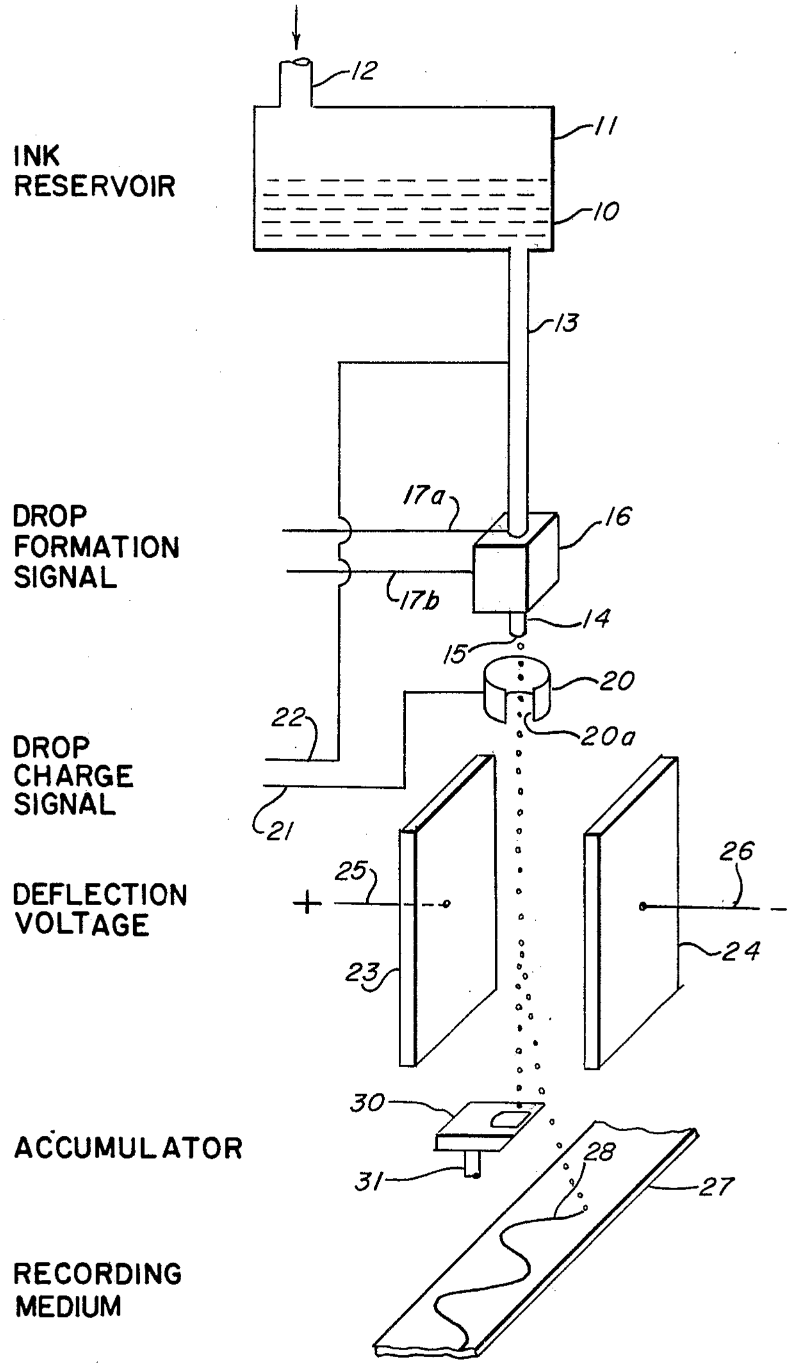
FIG. 1 is an illustrative showing of general components of a known ink jet printing system.

FIG. 1 shows a general arrangement for forming conductive ink into drops, selectively charging the drops, and controlling the flight of the drops in their course toward the recording medium, such as a paper web, so they strike predetermined positions. The conductive ink mass 10 is stored in a reservoir 11, into which ink is received through an inlet 12 and discharged through an outlet channel 13. In general, this system is pressurized to force the ink outwardly through channel 13 and through a smaller-dimension, pipe 14 which terminates in an orifice 15. A transducer 16, exemplarily shown as a piezoelectric structure is coupled to the discharge pipe 14, and a pair of electrical conductors 17*a*, 17*b* are connected thereto. Thus, when a suitable nozzle driving signal of the selected frequency is applied between the conductor leads 17*a*, 17*b*, the transducer 16 is excited and the pipe 14 is vibrated, which causes the stream leaving the orifice 15 to break-up into drops. The number of drops formed corresponds to the frequency of the nozzle driving signal. Of course, those skilled in the art will understand that other driving means, for example magnetostrictive, accoustical, and the like, can be used to introduce perturbations into the ink stream.

The section of a generally annular, cylindrical charging unit 20 is shown in FIG. 1, and electrical conductor 21 is connected to the charge ring 20. Another conductor 22 is connected to the discharge pipe 14, which is electrically conductive. Thus, a charging signal applied between conductor 21 and 22 is effective to induce an electrical charge in each drop as it breaks from the stream. Below the charging unit, to either side of the path traversed by the charged particles, are a pair of deflection plates 23, 24 which collectively comprise a deflection means. Conductors 25 and 26 are individually connected to the plates 23, 24 and a d-c potential difference, usually at least several thousand volts, is applied to the conductors. This sets up an electrical field between the plates 23, 24 which in turn causes a deflection of the charged drops by an amount, and in a direction, which is a function of both the amplitude and the polarity of the charge carried by the drop. This effects the precise control in which the drops mark the recording medium 27, thus defining the curve 28 or other intelligence which is to be placed on the paper. Of course, those skilled in the art will recognize that the principles of the present invention are applicable to a wide variety of ink jet printing system.

In the lower portion of FIG. 1, an accumulator 30 is depicted just above the recording medium 27. The accumulator or "dump" is positioned to catch any of the ink drops which are characterized so as not to strike the recording medium. The discharge channel 31 from the "dump" is connected to a source of vacuum, which returns the accumulated ink drops back in a path to enter the reservoir 10. It is noted that in various systems the accumulator may be positioned laterally of the web to collect ink drops characterized not to alight on the recording medium during normal operation. The present invention is considered applicable to either system, so long as the accumulator is generally positioned as shown in FIG. 1 during normal operation. To better understand the present invention, a detailed description will now to be set out.

DETAILED DESCRIPTION OF THE INVENTION

Figure 2:
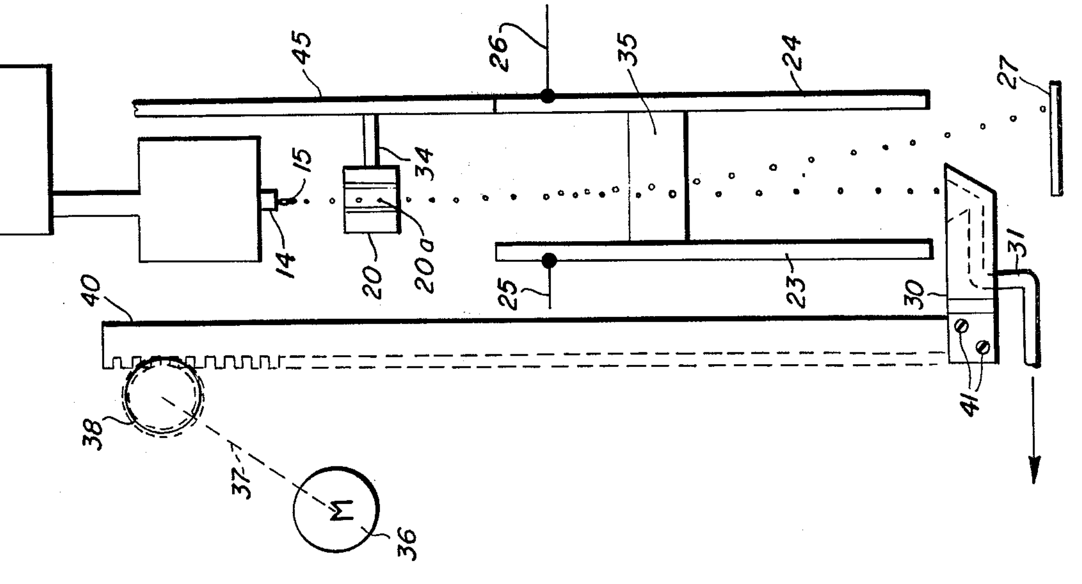
FIG. 2 is an illustration of means for displacing certain components of the known system, in accordance with the teaching of this invention.

FIG. 2 shows certain components of a system in which the reservoir 10 and the nozzle or ejection head 14 are generally as shown. The charging electrode 20, in accordance with one feature of the present invention, has an opening 20*a* to one side and is supported from an insulator arm 34, connected as will be better described in connection with FIG. 3. Likewise, the deflection plates 23, 24 of the deflection means are themselves supported from an insulator block 35, which is to the rear of the plates and thus out of the actual path traversed by the ink drops. The apparatus coupled to the insulator units 34, 35 will be explained in connection with FIG. 3.

Figure 3:
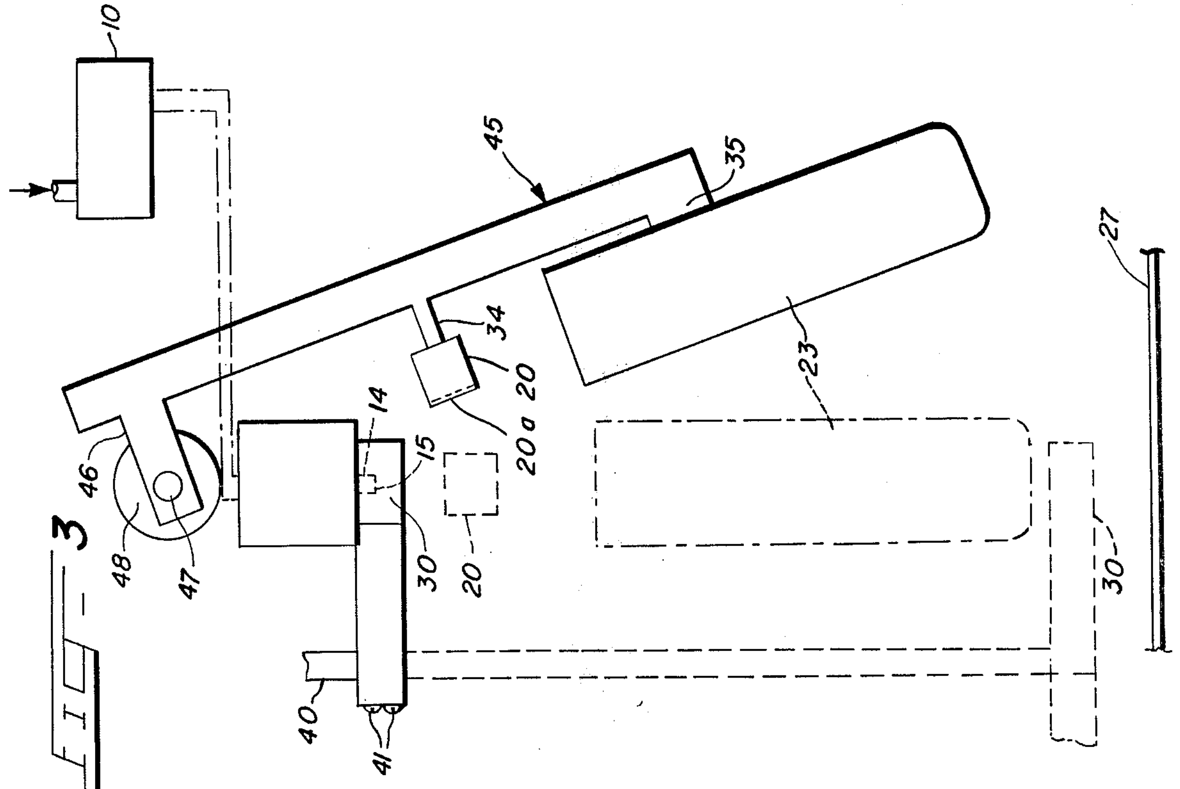
FIG. 3 is an illustration generally similar to the showing of FIG. 2, but depicting placement of the system components in the non-operating mode of the system.

In accordance with one aspect of the present invention, a first means is provided for moving the accumulator 30 from the position shown in FIG. 2, to a position (as depicted in FIG. 3) in which the accumulator abuts nozzle 14 and is aligned so as to receive any ink emanating from the orifice 15. As shown, the displacement means for the "dump" includes a first electrical motor 36 mechanically coupled over a linkage, represented by the broken line 37, to a pinion gear 38, shown engaging the end portion of a rack 40. The other end of the rack 40 is coupled to the accumulator by fastening means such as a pair of screws 41. Thus, when motor 36 is energized to rotate the pinion gear, the rack 40 is moved upwardly as viewed in FIG. 2 so that the "dump" travles along the path followed by the ink drops as they pass from the discharge orifice through the central portion of the charging unit and thereafter through the greater extent of deflection unit, before impinging on the recording medium. However, it is apparent that to effect this traversal of the ink drop path, the charging unit and deflecting unit must first be displaced out of the path, and this is accomplished by the mechanism depicted in FIG. 3.

FIG. 3 depicts the mechanism for displacing the charging unit 20 and the deflection unit 23, 24 away from the path traversed by the ink drops, facilitating movement of the accumulator from the position shown in FIG. 2, to that shown in FIG. 3. In the latter position the accumulator 30 abuts the ejection head and is aligned with the orifice thereby preventing the dispersal of ink from the ejection head. As exemplarily shown, the means for displacing the charging ring and the deflection unit may include an insulator member 45 having a sufficient length. The insulator member includes a first extension 34, for supporting the charging unit 20, and a second extension 35, for supporting the deflection plates 23, 24. The other end of insulator member 45 has a lever or pivot arm 46 journalled about a shaft 47, which shaft is mechanically coupled to a second motor 48. Thus, when the motor 48 is energized in a well known manner, the insulator member 45 is pivoted from its normal position, in which the members 20 and 23, 24 are supported in the positions shown in broken lines in FIG. 3, to the positions represented by the solid lines in FIG. 3. The charging unit 20 is provided with the opening 20*a* so that it can be moved tranversely of the ink path while droplets are projecting from the nozzle without interfering with the stream. The simple pivotal movement effectively displaces both the charging unit and the deflection plates out of the path traversed by the ink drops between the ejection head and the accumulator. This allows the rack and pinion gear to effect a linear traversal of the accumulator from a position displaced from the ejection head 14 as shown in FIG. 2, to another position adjacent the ejection head 14 as shown in FIG. 3, thereby effectively capturing ink emanating from the ejection head 14. Those skilled in the art will appreciate that the charging unit and deflection unit may take different forms to facilitate movement of the accumulator along the path shown without necessarily having to displace the charging unit and deflection unit. However, at the present time, the simplest and most direct method of moving the accumulator along the path normally traversed by the ink drops has been accomplished by providing a second mechanism for displacing the insulator member 45, and thus the charging unit and the deflection unit, away from the path of ink drop unit.

It is evident that the principles of the present invention are applicable to the various ink jet or ink drop printing mechanisms in which the ink drops are charged and deflected between a drop formation orifice and the point at which they inpact the recording medium. The present invention provides an accumulator with an ink discharge channel, so that all the ink accumulated both during system start-up and system shut-down can be saved and returned to the ink reservoir. Even more important, by traversing the path normally followed by the ink drops, the accumulator intercepts all the drops during start-up and shut-down of the system, thereby obviating the undesired dispersal of the ink to any of the system components while pressure is increased to obtain control of the stream and while pressure is decreased to terminate the stream. This prevents deposition of ink on components as a result of wayward minute ink particles, which ink deposition besides being unsightly could also eventually provide a conductive path to ground and cause electrical shorting of the components.

Although the preferred embodiment of the present invention has been shown using a system in which discrete droplets are used, the present invention would be applicable to a drop writing system in which an ink stream is used to print and which has a dump adjacent the recording medium. Such a system would require only the deflection plates to be moved out of position adjacent the ink stream path so that the accumulator can travel along the path.

Also though the embodiment described shows use of electrical control of the ink, the teachings of the present invention are adaptable to systems using other types of ink control such as magnetics, for example. In that instance the magnetic characterizing means adjacent the ink path has to be moved out of the path of the accumulator so it can travel toward and away from the nozzle orifice.

While only a particular embodiment of the invention has been described and claimed herein, it is apparent that various modifications and alterations of the invention may be made. It is, therefore, the intention in the appended claims to cover all such modifications and alterations as may fall within the true spirit and scope of the invention.

What is claimed is:

1. A system for printing by directing ink along a path toward a record medium, comprising:

an ink ejection head defining an orifice for directing ink toward the record medium;

means for characterizing the ink for controlling its path for deposition at predetermined positions on the record medium, an accumulator normally positioned adjacent the record medium for catching ink directed away from the record medium; and means, operative upon start-up of the system and shut-down of the system for moving said accumulator between a pair of positions, one position adjacent said ejection head and the other position disposed a predetermined distance away from said ejection head, said accumulator while moving between said positions being oriented to intercept ink projected from said ejection head.

2. A printing system as claimed in claim 1, in which the means for moving the accumulator includes a rack coupled to the accumulator, a pinion gear engaging the rack, and a motor coupled to the pinion gear to drive the pinion gear and thus displace the accumulator when the motor is energized, ensuring a linear path of movement for the accumulator substantially identical with the ink drop path.

3. A printing system as claimed in claim 1 wherein the ink is in the form of drops and in which the means for characterizing the ink drops and for controlling their path is a charging unit and a deflection unit.

4. A printing system as claimed in claim 3, and further comprising means effective during system shut-down, to displace both the deflection unit and the charging unit away from the ink drop path before movement of the accumulator to overlie said ejection head, and effective upon system start-up for returning the charging unit and the deflection unit to their normal operating positions after the accumulator has been moved from its rest position adjacent to said ejection head to its normal operating position in proximity to the medium.

5. A printing system as claimed in claim 4, in which the means for displacing the charging unit and the deflection unit comprises an insulator member having a first extension for supporting the charging unit and a second extension for supporting the deflection unit, and means coupled to the insulator member for effecting displacement of the insulator member with consequent movement of the charging unit and the deflection unit away from the ink drop path.

6. A system for printing having a head with an orifice from which ink emanates along a path toward a record medium and a charging unit disposed adjacent the ink drop path for electrically characterizing individual drops prior to the drops passing by a deflection unit, the droplets either impinging on the record medium or entering an ink accumulator, the combination comprising means effective during start-up of the system for maintaining the accumulator adjacent the ejection head to catch the ink emanating from the orifice until the system is ready for operation, after which the accumulator is moved substantially along the ink path to a position adjacent the medium, and means effective upon shut-down of the system for moving the accumulator substantially along the ink drop path to a position abutting the ejection head.

7. In an ink jet printing system of the type wherein a continuous stream of individual droplets of ink is produced and propelled by pressure from an orifice and through an electric field, and which includes an accumulator wherein droplets not desired to be used to imprint on a surface are received, the improvement comprising:

means for moving the accumulator between a normal operating position near the surface and a rest position adjacent the orifice, said accumulator movable along a path between said positions whereby the ink droplets are intercepted by the accumulator as it moves.

8. In an ink jet system having an orifice for directing ink under pressure along a predetermined path toward a recording medium for marking the latter and including an accumulator for intercepting ink which is selected not to strike the recording medium and an ink characterizing unit normally positioned along the path between the orifice and the recording medium, the combination comprising means for selectively moving the ink characterizing unit relative to the ink path, means for moving the accumulator during a start-up period substantially along the ink path and away from the orifice, and means for moving the accumulator during a shutdown period substantially along the ink path and toward the orifice, said means for moving the characterizing unit displacing said unit out of the way of the moving accumulator.

* * * * *